United States Patent [19]

Arimoto

[11] Patent Number: 4,989,098

[45] Date of Patent: Jan. 29, 1991

[54] PROCESSING APPARATUS USING SELECTABLE PERIOD TRIANGULAR OR SAWTOOTH WAVES

[75] Inventor: Shinobu Arimoto, Tokyo, Japan

[73] Assignee: Canon Kabushiki Kaisha, Tokyo, Japan

[21] Appl. No.: 276,935

[22] Filed: Nov. 28, 1988

[30] Foreign Application Priority Data

Dec. 1, 1987 [JP] Japan .................. 62-301404

[51] Int. Cl.$^5$ ........................................... H04N 1/40
[52] U.S. Cl. .................... 358/455; 358/298; 358/456
[58] Field of Search ................ 358/298, 455, 456

[56] References Cited

U.S. PATENT DOCUMENTS

| | | | |
|---|---|---|---|
| 3,916,096 | 10/1975 | Everett et al. | 358/456 |
| 4,782,398 | 11/1988 | Mita | 358/456 |
| 4,811,037 | 3/1989 | Arai | 358/298 |
| 4,819,066 | 4/1989 | Miyagi | 358/456 |
| 4,831,392 | 5/1989 | Dei | 364/519 |
| 4,847,654 | 7/1989 | Honma et al. | 358/300 |

FOREIGN PATENT DOCUMENT 5,017,919 2/1975 Japan

Primary Examiner—Edward L. Coles, Sr.
Attorney, Agent, or Firm—Fitzpatrick, Cella, Harper & Scinto

[57] ABSTRACT

An image processing apparatus includes an input unit for inputting an image signal, a conversion unit for converting the image signal input from the input unit and outputting the converted image signal, and an output unit for outputting a pulse-width modulation signal based on the converted image signal output from the conversion unit. The output unit is operated in a fixed period processing mode regardless of an output characteristic of the pulse-width modulation signal, and outputs the pulse-width modulation signal. The conversion unit switches a conversion mode of the input image signal in association with the output characteristic of the pulse-width modulation signal.

12 Claims, 17 Drawing Sheets

| CONVERSION DATA 18<br>SCREEN DATA 17 | 0 | 1 | 2 | 3 | 4 | 5 |
|---|---|---|---|---|---|---|
| 0 (400 LINES) | X | X | X | X | X | X |
| 1 (200 LINES) | 2 × X | 2 × (X-31) | 2 × X | 2 × (X-31) | 2 × X | 2 × (X-31) |
| 2 (133 LINES) | 3 × X | 3 × (X-21) | 3 × (X-42) | 3 × X | 3 × (X-21) | 3 × (X-42) |

FIG. 13

| CONVERSION DATA 18<br>SCREEN DATA 17 | 0 | 1 | 2 | 3 | 4 | 5 |
|---|---|---|---|---|---|---|
| 0<br>(400 LINES) | NON-INVERSE<br>X | NON-INVERSE<br>X | NON-INVERSE<br>X | NON-INVERSE<br>X | NON-INVERSE<br>X | NON-INVERSE<br>X |
| 1<br>(200 LINES) | INVERSE<br>63-X | NON-INVERSE<br>X | INVERSE<br>63-X | NON-INVERSE<br>X | INVERSE<br>63-X | NON-INVERSE<br>X |
| 2<br>(133 LINES) | INVERSE<br>127-2X | INVERSE<br>63-2X | NON-INVERSE<br>X | INVERSE<br>127-2X | INVERSE<br>63-2X | NON-INVERSE<br>X |

| CONVERSION DATA 18 / SCREEN DATA 17 | 0 | 1 | 2 | 3 | 4 | 5 |
|---|---|---|---|---|---|---|
| 0 (400 LINES) | X | X | X | X | X | X |
| 1 (200 LINES) | $3 \times X$ | $\frac{3}{2} \times (X-21)$ | $3 \times X$ | $\frac{3}{2} \times (X-21)$ | $3 \times X$ | $\frac{3}{2} \times (X-21)$ |
| 2 (133 LINES) | $2 \times X$ | $3 \times (X-31)$ | $6 \times (X-52)$ | $2 \times X$ | $3 \times (X-31)$ | $6 \times (X-52)$ |

PROCESSING APPARATUS USING SELECTABLE PERIOD TRIANGULAR OR SAWTOOTH WAVES

BACKGROUND OF THE INVENTION (1) Field of the Invention

The present invention relates to an image processing apparatus for processing an image signal.

(2) Related Background Art

As a conventional method of pulse-width modulating (PWM-modulating) an input multi-value signal, a method of comparing the input signal with a triangular wave or saw-tooth wave having a predetermined period is known. A method of operating a counter at a frequency 10 to 1,000 times a sync clock of an input to generate a pulse signal in the counting state is also known. As a method of varying a pulse generation period, as shown in FIG. 23, triangular generators 230 to 232 corresponding to pulse generation periods are arranged, and triangular waves generated by the generators 230 to 232 are compared with an analog video signal 233 by comparators 234 to 236, respectively, thus forming pulse-width modulation (PWM) signals. One of these PWM signals is selected by a selector 237 in correspondence with the value of screen data 238 in units of input pixel periods, and the selected signal is output as a PWM signal.

FIGS. 24A and 24B show examples of such a PWM signal. FIG. 24A shows an example wherein the video data 233 is PWM-modulated by a 200 lines triangular wave 240, and FIG. 24B shows an example wherein the video data 233 is PWM-modulated by a 133 lines triangular wave 241.

The method of PWM-modulating an image signal while switching the period of a triangular wave is particularly effective when a laser beam is flashing-controlled by the PWM signal, and image formation is performed using an electrophotographic technique. More specifically, if the generation period of a triangular wave is prolonged, the gradation property can be improved, and if it is shortened, resolution can be improved. Therefore, the triangular wave is selectively used in accordance with the type of image data (character or photograph data (half-tone data)), thus improving reproducibility of an image. Recently, for a technique of reducing moire noise due to frequency components of the triangular wave and the image signal, demand has arisen for ability arbitrarily to set the shape of a triangular wave like a triangular wave or saw-tooth wave in units of generation periods of the triangular wave. Some approaches are made to correct, in accordance with the shape of a triangular wave or saw-tooth wave, gradation deformation inherent to electrophotography in which a high-light portion of an image tends to be omitted or a shadow portion tends to be flattened.

However, in the above related art, the number of pulse width generation periods to be selected is limited to the number of triangular or saw-teeth generators. In order to realize an arbitrary number of pulse width generation periods, pulse generators corresponding to the arbitrary number must be prepared. The shape of a reference signal such as a triangular or saw-tooth wave cannot be defined, unless, a triangular wave generating means or saw-tooth wave generating means is prepared. A technique of changing a waveform such as a triangular wave must be performed by a nonlinear amplifier such as a log amplifier. Reference signal generating means having different nonlinear characteristics must be prepared in accordance with the shapes of waveform. When an effect equivalent to a triangular wave is to be obtained by a digital signal using a counter or the like, up- and down-count operations must be switched at high speed.

The above-mentioned gradation processed is disclosed on U.S. Pat. applications Ser. Nos. 090,238 (filed on Aug. 25, 1987), 282,896 (a continuation of Ser. No. 013,629, filed Feb. 11, 1987), 425,445 ( a continuation of Ser. No. 897,053, filed Aug. 15, 1986), and 188,712 (filed on Apr. 29, 1988) and U.S. Pat. Nos. 4,661,859, 4,763,199, 4,782,398, 4,800,442, 4,811,037, 4,819,066, 4,831,392, 4,847,654, 4,847,695, 4,864,419, 4,868,684, 4,870,499, 4,873,428, 4,897,734, and 4,905,023, and Japanese Pat. application Laid-Open No. 50-17919, and the like. However, a further improvement is required.

SUMMARY OF THE INVENTION

It is an object of the present invention to eliminate the conventional drawbacks.

It is another object of the present invention to improve an image processing apparatus.

It is still another object of the present invention to provide an image processing apparatus which can obtain a high-quality reproduced image.

It is still another object of the present invention to provide an image processing apparatus which can obtain a desired reproduced image with a simple structure.

It is still another object of the present invention to provide an image processing apparatus which can obtain a high-quality reproduced image at high speed.

It is still another object of the present invention to provide an image processing apparatus which can obtain a reproduced image with excellent gradation property and resolution.

It is still another object of the present invention to provide an image processing apparatus which can accurately reproduce an original image.

It is still another object of the present invention to provide an image processing apparatus which can PWM-modulate an input image signal with a desired period.

The above and other objects of the present invention will become apparent from the following description taken in conjunction with the accompanying drawings, and the appended claims.

BRIEF DESCRIPTION OF THE DRAWINGS

FIG. 13 is a table showing data conversion by a conversion table 120 shown in FIG. 12;

DETAILED DESCRIPTION OF THE PREFERRED EMBODIMENTS

The preferred embodiments of the present invention will now be described in detail with reference to the accompanying drawings.

Figures 2, 3:
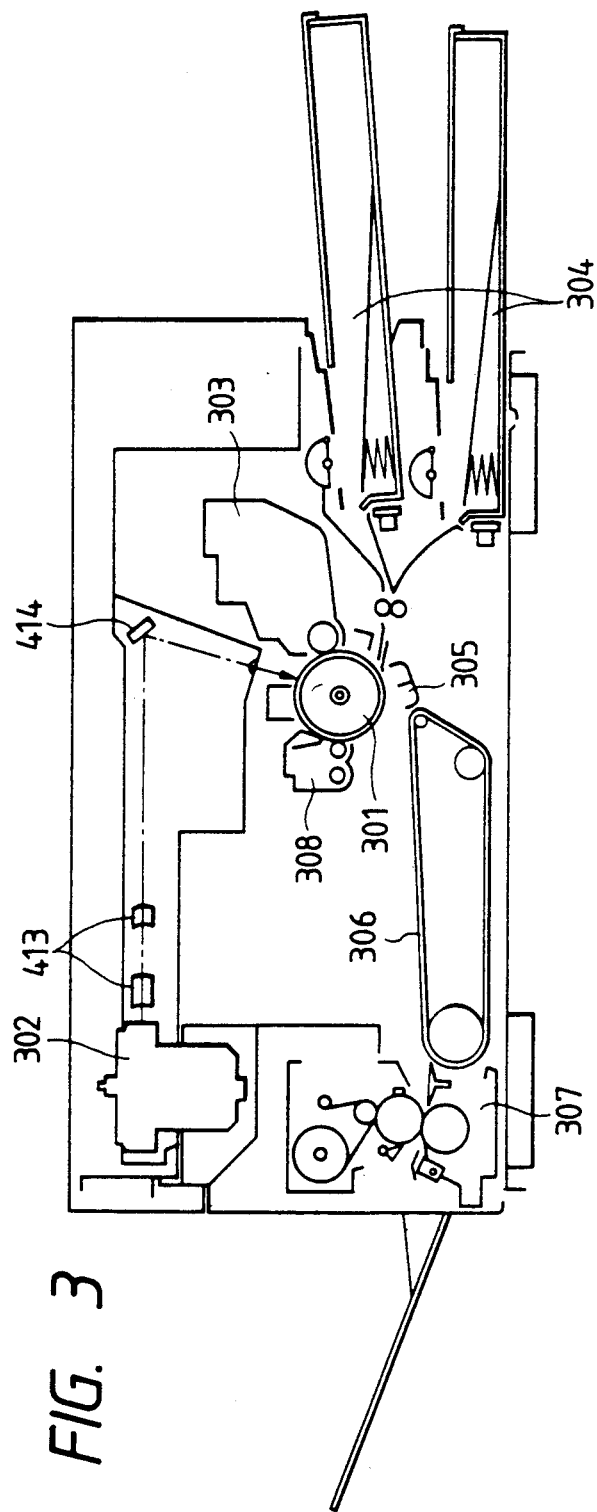
FIG. 2 is a table showing conversion examples of a conversion table 106 shown in FIG. 1.
FIG. 3 is a sectional view showing the structure of a laser beam printer according to the embodiment of FIG. 1.
Figure 4:
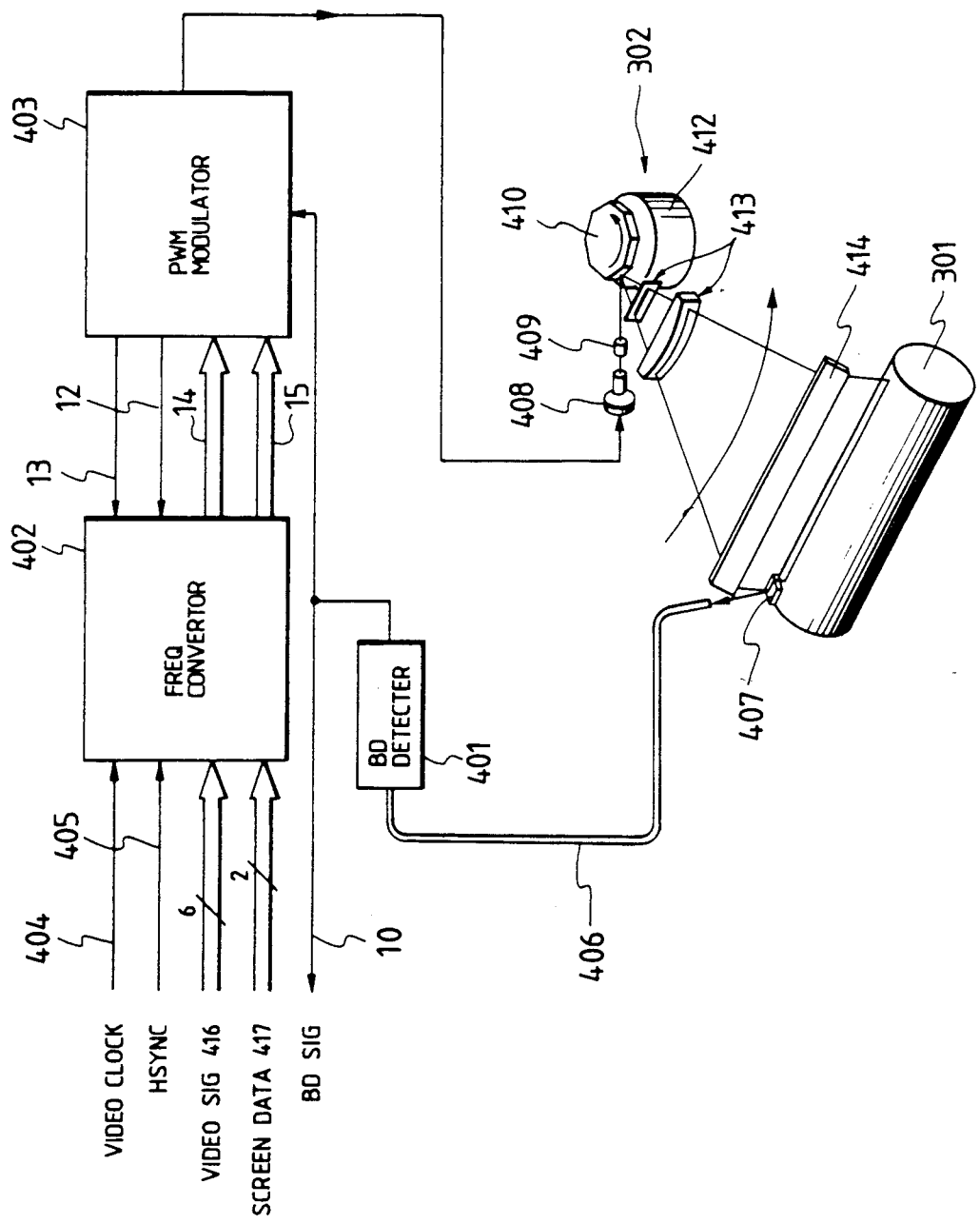
FIG. 4 is a block diagram schematically showing an arrangement of an image forming unit of the laser beam printer.

Description of Laser Beam Printer (FIGS. 3 and 4)

FIG. 3 is a sectional view showing the structure of a laser beam printer according to this embodiment.

A laser beam is radiated from a polygonal scanner 302 on a photosensitive drum 301, thus forming an electrostatic latent image on the surface of the drum 301. The latent image is developed with toner by a developing unit 303. The toner image is transferred onto a paper sheet fed from a paper feed cassette 304 by a transfer unit 305. The paper sheet on which the toner image is transferred is conveyed to a fixing unit 307 by a conveyor belt 306, and the toner image is thermally compressed and fixed on the paper surface. A cleaner 308 recovers toner which is not transferred onto the paper sheet.

FIG. 4 shows an arrangement of a laser image forming unit of the laser beam printer of this embodiment.

In FIG. 4, a video clock signal 404 is input from a host computer in synchronism with a video signal 416.

A horizontal sync signal (HSYNC signal) 405 of the video signal 416 is also input from the host computer. A frequency converter 402 of image data receives the video clock signal 404, the HSYNC signal 405, and the video signal 416, and screen data (line number data) 417, which are input from the host computer, and an HSYNC signal 12 and a video clock signal 13 from a PWM modulator 403 (to be described later), and performs frequency conversion of an image signal to output video data 14 and screen data 15. The frequency converter 402 comprises a FIFO (first-in, first-out) memory for one line, and stores the video signal 416 in this memory. The stored video signal is read out in response to the video clock signal 13 from the PWM modulator 403.

A BD mirror 407 is arranged near a scanning start point of the laser beam on the photosensitive drum 301. The laser beam reflected by the BD mirror is guided to a BD detector 401 through an optical fiber 406. When the laser beam is detected by the BD detector, a BD signal 10 is output. The BD signal becomes a signal indicating an actual scanning position of the beam. The BD signal 10 is input to the PWM modulator 403, and is also supplied to the host computer (not shown). The host computer outputs the one-line HSYNC signal 405, video clock signal 404, 6-bit video signal 416, and the screen data 417 indicating the number of recording lines in synchronism with the BD signal 10.

An effective length in the laser scanning direction (main scanning direction) of the photosensitive drum 301 of this embodiment corresponds to an A3 size, the recording density in the main scanning direction is 400 dots/inch (dpi) and the recording density in the drum rotating direction (sub-scanning direction) is 400 lines/inch (lpi). Since the peripheral velocity of the drum 301 is 0.3"/sec, the period of the BD signal 10 corresponds to 1/120 sec, i.e., 8.33 msec. Therefore, the host computer transmits one-line image data corresponding to the width of the A3 size (4677 pixels) at an arbitrary speed in accordance with the BD signal 10 having the 8.33-msec period.

The PWM modulator 403 reads out the video data 14 from the frequency converter 402 using the video clock signal 13. The frequency of the video clock signal 13 is defined by an effective utilization factor of 70% of a decahedral mirror 410. In this embodiment, if the period of the BD signal 10 is 8.33 msec, image data of 4677 pixels corresponding to the width of the A3 size are read out in a period 70% of 8.33 msec, and hence, the frequency of the video clock signal 13 is 802 kHz.

The laser beam modulated and output by the PWM modulator 403 is input to the decahedral mirror 410 through a collimator lens 408 and a cylindrical lens 409. A polygonal scanner motor 412 rotates the decahedral mirror 410 to cause it reflect and scan the laser beam. A focusing lens 413 performs an f-θ correction. The laser beam output from the focusing lens 413 is reflected by a reflection mirror 414, and is focused on the photosensitive drum 301, thus forming a latent image having a potential corresponding to the pulse width of the PWM signal.

PWM Modulator (FIGS. 1-8)

Figure 1:
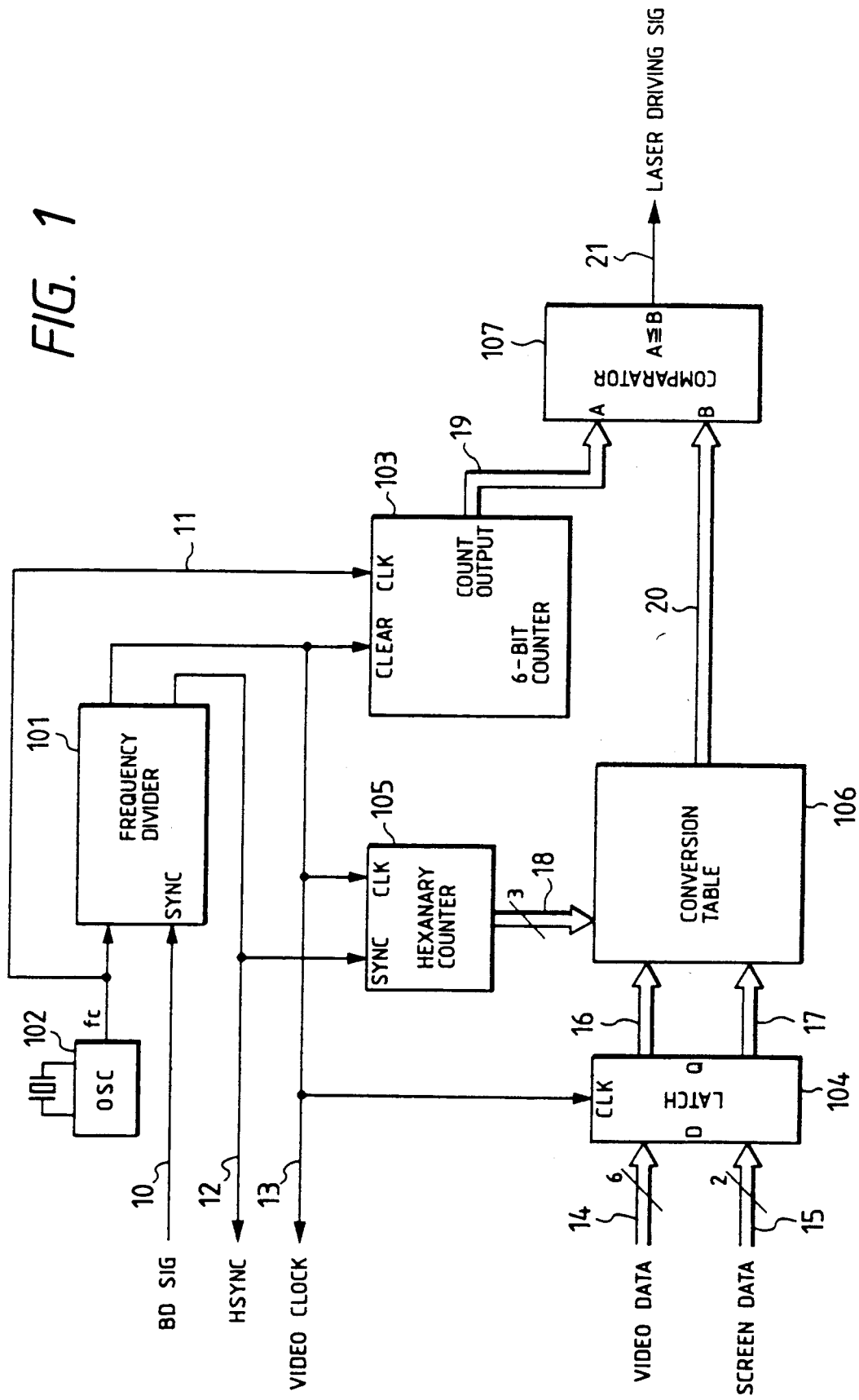
FIG. 1 is a block diagram schematically showing an arrangement of a PWM modulator according to a first embodiment of the present invention.

FIG. 1 is a block diagram schematically showing an arrangement of the PWM modulator 403 of this embodiment.

Figure 8:
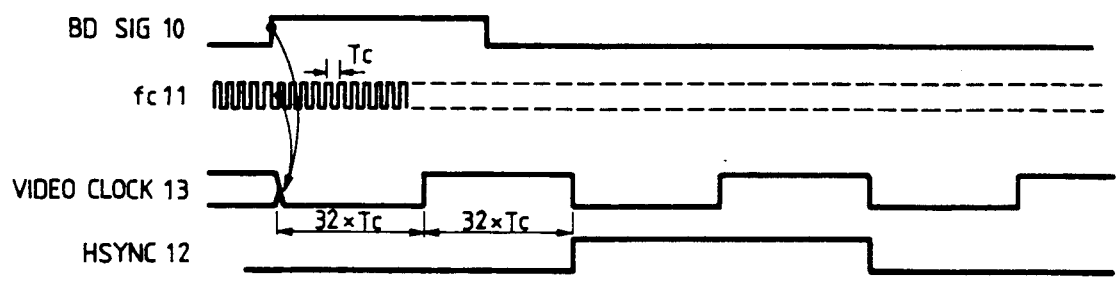
FIG. 8 is a timing chart showing timings of a video clock, a BD signal, and a horizontal sync signal.

The PWM modulator 403 includes an oscillator 102 for outputting a clock (fc) signal 11, and a frequency divider 101 for frequency-dividing by 64 the clock signal 11 to output the video clock signal 13 having a predetermined period, and to output the HSYNC signal 12. FIG. 8 is a chart for explaining timings of these signals. The video clock signal 13 is obtained by frequency-dividing the clock signal 11 by 64 in synchronism with the BD signal 10. The HSYNC signal 12 is output in synchronism with the trailing edge of the video clock signal 13 after the BD signal 10 is output.

A 6-bit counter 103 is cleared in response to the leading edge of the video clock signal 13, and is counted up in response to the clock signal 11. An output 19 from the counter 103 includes a digital value varying from "0 " to "63" in one period of the video clock signal 13, and serves as a digital saw-tooth wave corresponding to a screen of 400 lines/inch. A latch 104 latches the video data 14 from the frequency converter 402 and the recording line number (screen) data 15 in response to the video clock signal 13, and performs synchronization with the output 19 from the counter 103. The screen data 15 has a 2-bit configuration. When the bits of the data 15 represent "0", this indicates that data is recorded by a screen of 400 lines/inch (400 lines screen); when "1", a 200 lines screen; and when "2", a 133 lines screen. That is, the screen data indicates the resolution of a reproduced image.

A hexanary counter 105 starts counting of the video clock signal 13 in synchronism with the HSYNC signal 12, and outputs a value varying from "0" to "5" as conversion data 18. A conversion table 106 receives the conversion data 18, the 6-bit video data 16, and the 2-bit screen data 17, and outputs conversion video data 20 obtained by converting the video data 16. A digital comparator 107 compares the conversion video data 20 with a digital saw-tooth wave 19 of the 400 lines screen. When the conversion video data 200 is larger, the digital comparator 107 inputs data "1", and outputs a PWM laser driving signal 21.

FIG. 2 shows the conversion video data 20 output from the conversion table 106. In FIG. 2, symbol "x" represents the value of the video data 16.

When the screen data 15 is "0" (400 lines), the video data 16 is output as it is. When the screen data 15 is "1" or "2", the video data 14 is converted as shown in FIG. 2, and is output. Note that the conversion table 106 and those in other embodiments described later comprise RAMs, but may comprise other arithmetic circuits.

Figure 7:
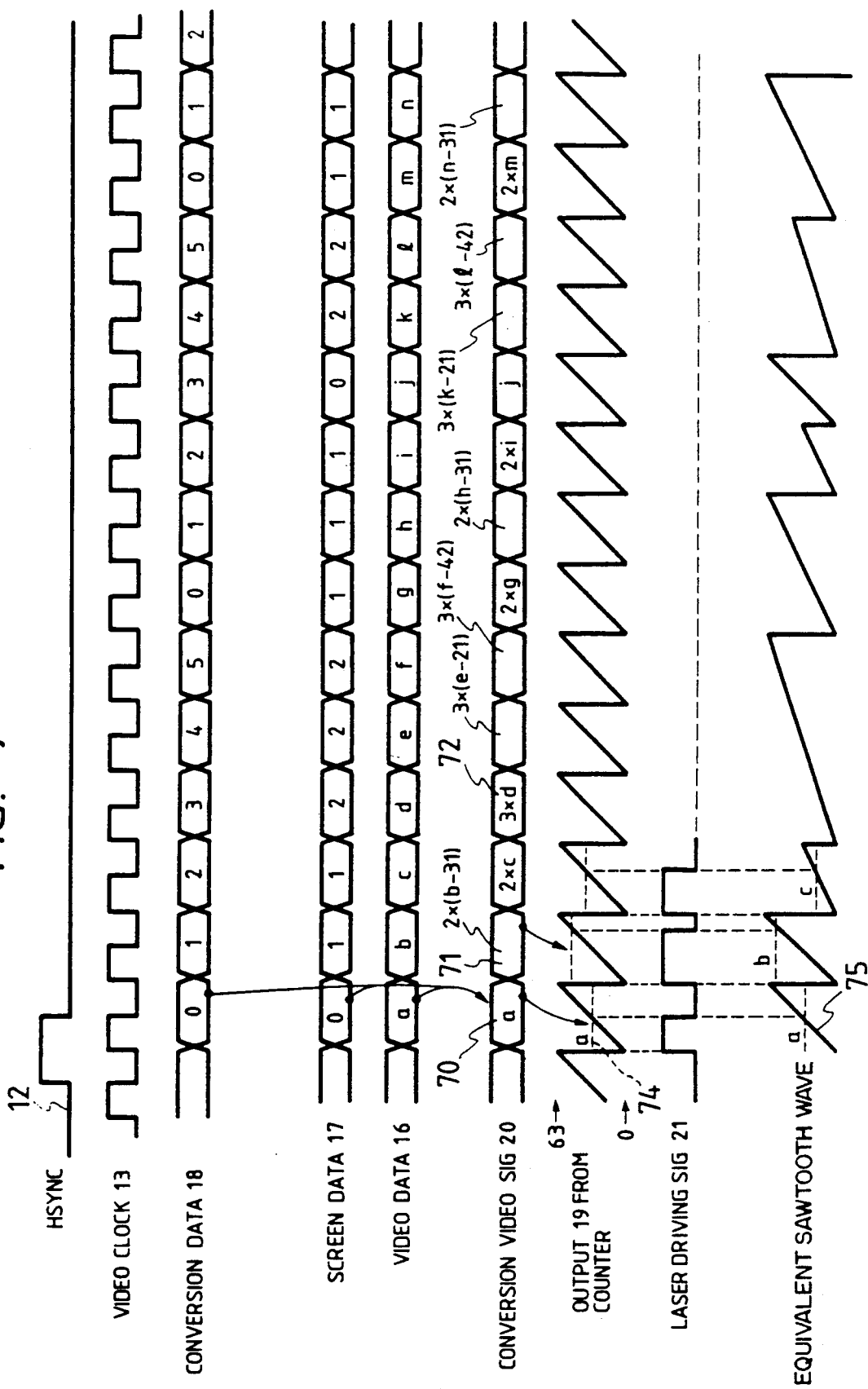
FIG. 7 is a timing chart of FIG. 1.

FIG. 7 shows the timings of the above-mentioned data and signals, and the same reference numerals denote the common portions to FIG. 1.

When both the conversion data 18 and the screen data 17 are "0" and the signal level of the video data 16 is "a", the conversion video data 20 has a value indicated by 70 in FIG. 7. When both the conversion data 18 and the screen data 17 are "1" and the signal level of the video data 16 is "b", the conversion data video data 20 has a value indicated by 71. In this case, the value of the conversion video data 20 is given by $2\times(b-31)$ according to the formula $2\times(x-31)$ in FIG. 2. Similarly, when the conversion data 18 is "3", the screen data 17 is "2", and the signal level of the video data 16 is "d", the conversion video data 20 has a value ($3\times d$) indicated by 72.

In these cases, the conversion video data 20 has signal levels indicated by 74, and the corresponding PWM laser driving signal 21 is illustrated therebelow. A saw-tooth wave 75 is compared with the video data 16 in order to obtain the laser driving signal 21 shown in FIG. 7. In order to obtain the laser driving signal 21, the saw-tooth wave 75 is necessary. Since the video data 16 is converted by the conversion table 106, the laser driving signal 21 shown in FIG. 7 can be obtained using the digital saw-tooth wave 19 of 400 lines screen from the counter 103.

A case will be explained below wherein the video data 16 is converted by the conversion table 106 and recording operations of other numbers of lines are performed using the 400 lines digital saw-tooth wave.

Figure 5:
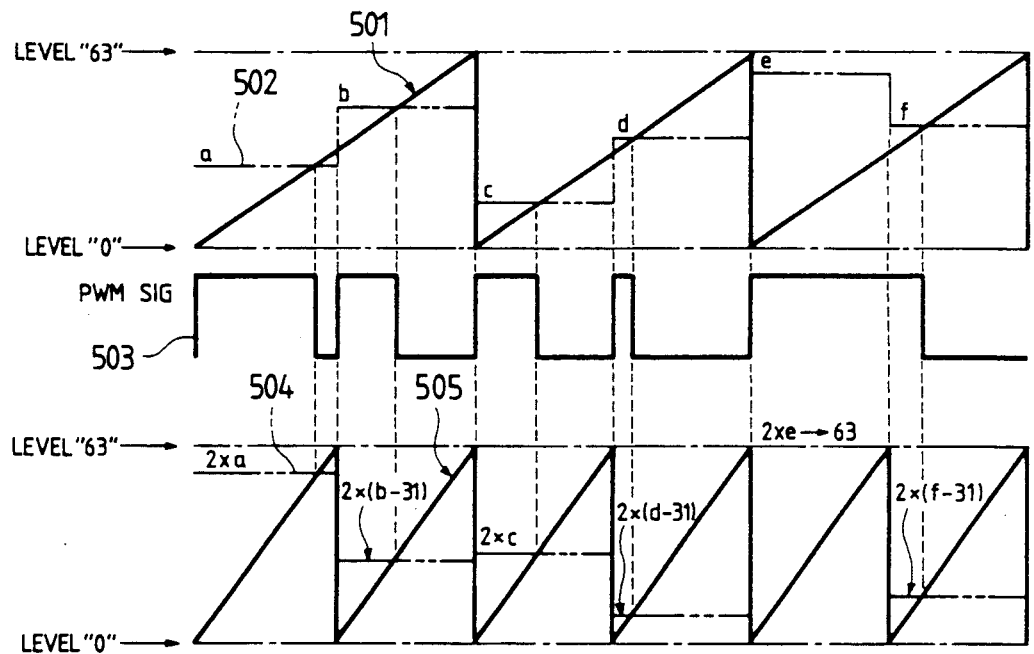
FIG. 5 is a chart showing a case wherein modulation by a 200 lines saw-tooth wave is realized using a 400 lines saw-tooth wave in the first embodiment.

FIG. 5 is a view for explaining a case wherein recording of a 200 lines screen is performed using a saw-tooth wave 505 of the 400 lines screen.

A waveform 501 represents an example of a digital saw-tooth wave of the 200 lines screen, and a waveform 502 represents an example of the video data 16. Levels a to f are those of the video data 16 corresponding to the output values (0 to 5) of the conversion data 18. A waveform 503 represents an example of the laser driving signal 21 which is output when the saw-tooth wave 501 and the video data 502 are input to the comparator 107.

A waveform 505 represents an example of the digital saw-tooth wave 19 of the 400 lines screen, which is output from the counter 103. In order to obtain a PWM signal 503 using the digital saw-tooth wave 505, the video data 16 must be converted to the signal level indicated by 504.

In this case, conversion given by $2\times(b-31)$ can be performed. That is, video data a to be compared with the first half of a positive inclination portion of the saw-tooth wave 501 of the 200 lines screen is doubled, and half the total signal level width (31) is subtracted from video data b to be compared with the second half of the positive inclination portion and the difference is doubled.

Figure 6:
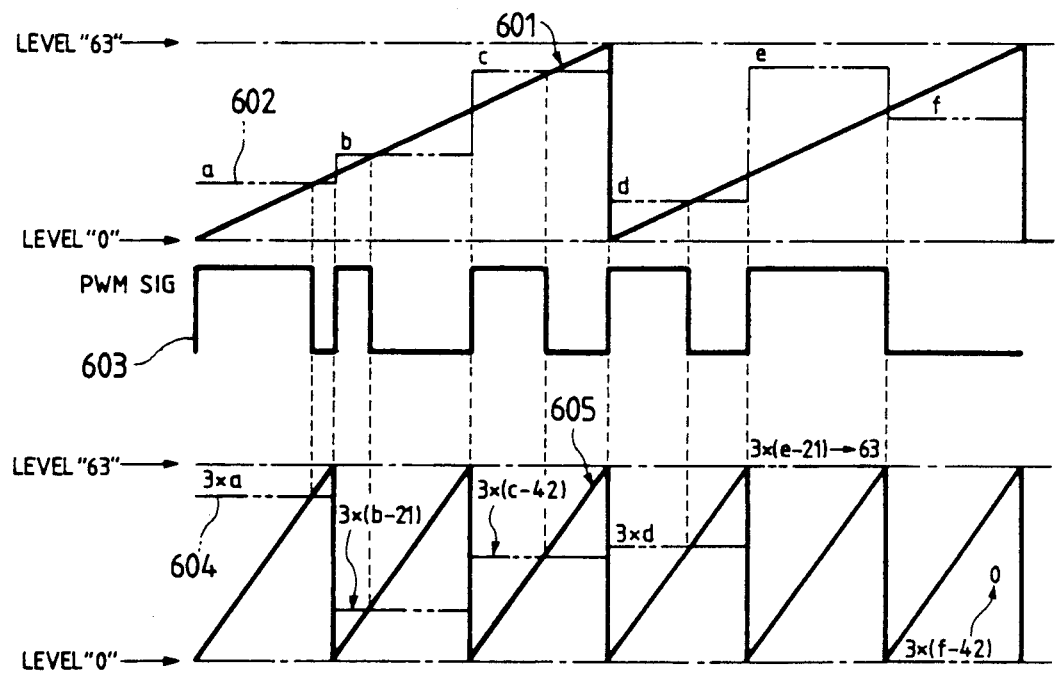
FIG. 6 is a chart showing a case wherein modulation by a 133 lines saw-tooth wave is realized using a 400 lines saw-tooth wave in the first embodiment.

Similarly, FIG. 6 shows conversion of the video data in order to obtain an output equivalent to a saw-tooth wave 601 of a 133 lines screen using a saw-tooth wave 605 of the 400 lines screen.

In the same manner as in FIG. 5, video data 602 is compared with the saw-tooth wave 601 of the 133 lines screen to obtain a PWM signal 603. In order to obtain the PWM signal 603 using the saw-tooth wave 605 of the 400 lines screen, the video data is converted as indicated by 604. Video data a to be compared with the first portion of a positive inclination portion of the saw-tooth wave 601 of the 133 lines screen is multiplied by 3, ($\frac{1}{3}\times$ the total signal level width (63)=21) is subtracted from video data b to be compared with the second portion of the positive inclination portion, and the difference is multiplied by 3. In addition, ($\frac{2}{3}\times$ the total signal level width =42) is subtracted from video data c to be compared with the third portion of the positive inclination portion, and the difference is multiplied by 3.

The conversion data 18 as the output from the hexanary counter 105 is a signal indicating whether a saw-tooth wave to be compared is the first or second half of the saw-tooth wave of the 200 lines screen, or is the first, second, or third portion of the saw-tooth wave of the 133 lines screen. As shown in FIG. 2, when the screen data is "1" to indicate a recording mode of the 200 lines screen, if the conversion data 18 has values "0, 2, 4", this indicates the first half of the saw-tooth wave, and if it has values "1, 3, 5", this indicates the second half of the saw-tooth wave. In the first half, the input "x" is converted to 2x, and in the second half, the input "x" is converted to $2\times(x-31)$.

When the screen data 17 is "2" (133 lines), if the conversion data 18 has values "0, 3", it indicates the first portion. In this case, the input "x" is converted to 3x. If the conversion data 18 has values "1, 4", it indicates the second portion, and the input "x" is converted to 3 x (x−21). If the conversion data 18 has values "2, 5", it indicates the third portion, and the input "x" is converted to 3 x (x− 42).

Second Embodiment (FIGS. 9–14)

Figure 9:
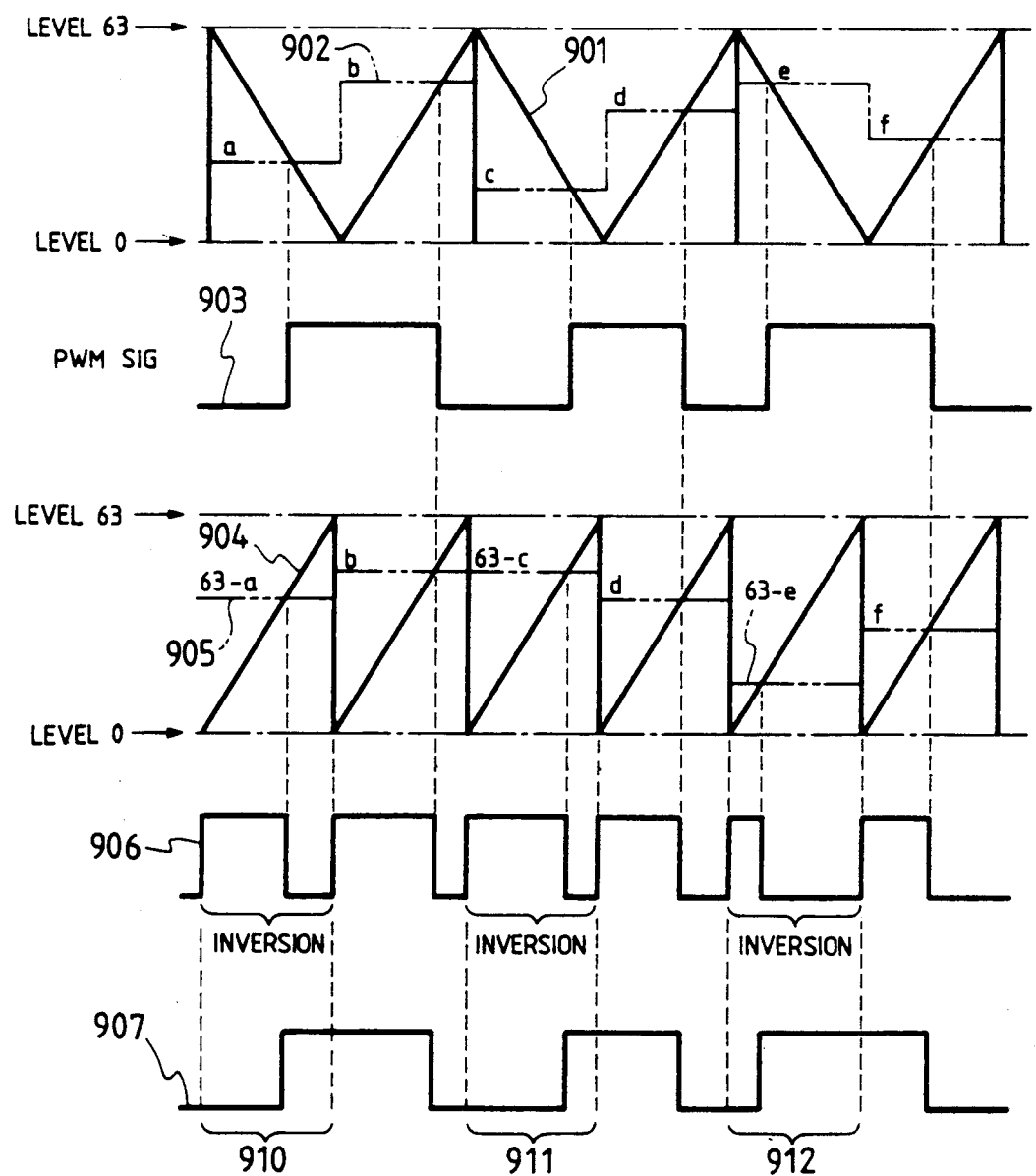
FIG. 9 is a chart showing a case wherein modulation by a 200 lines triangular wave is realized using a 400 lines saw-tooth wave in a second embodiment.

FIG. 9 is a chart for explaining timings of a second embodiment capable of varying a generation period of a pulse width.

A waveform 901 in FIG. 9 represents a triangular wave of a 200 lines screen, and a waveform 902 indicates video data. A PWM signal 903 is obtained by PWM-modulating the video data 902 with the triangular wave 901. In order to obtain the PWM signal 903 using a saw-tooth wave 904 of the 400 lines screen, portions a, c, and e of the video data 902 to be compared with a negative inclination portion of the triangular wave 901 of the 200 lines screen is converted as represented by a waveform 905.

More specifically, the negative inclination portion of the triangular wave 901 of the 200 lines screen is obtained by vertically inversing the saw-tooth wave 904 of the 400 lines screen. Therefore, instead of inversing the inclination of the saw-tooth wave 904 of the 400 lines screen, the video data 902 is inverted (i.e., subtracted from the maximum level value "63"), so that intersections of the inversed video data 905 and the saw-tooth wave 904 coincide with the time base. However, in this state, since portions obtained by inverting the video data of the PWM waveform 906 have an inversed polarity, the polarity of these portions must be inversed.

A waveform 907 is obtained by inverting portions 910 to 912 having the inverted polarity, and is the same as the PWM waveform 903.

Figure 10:
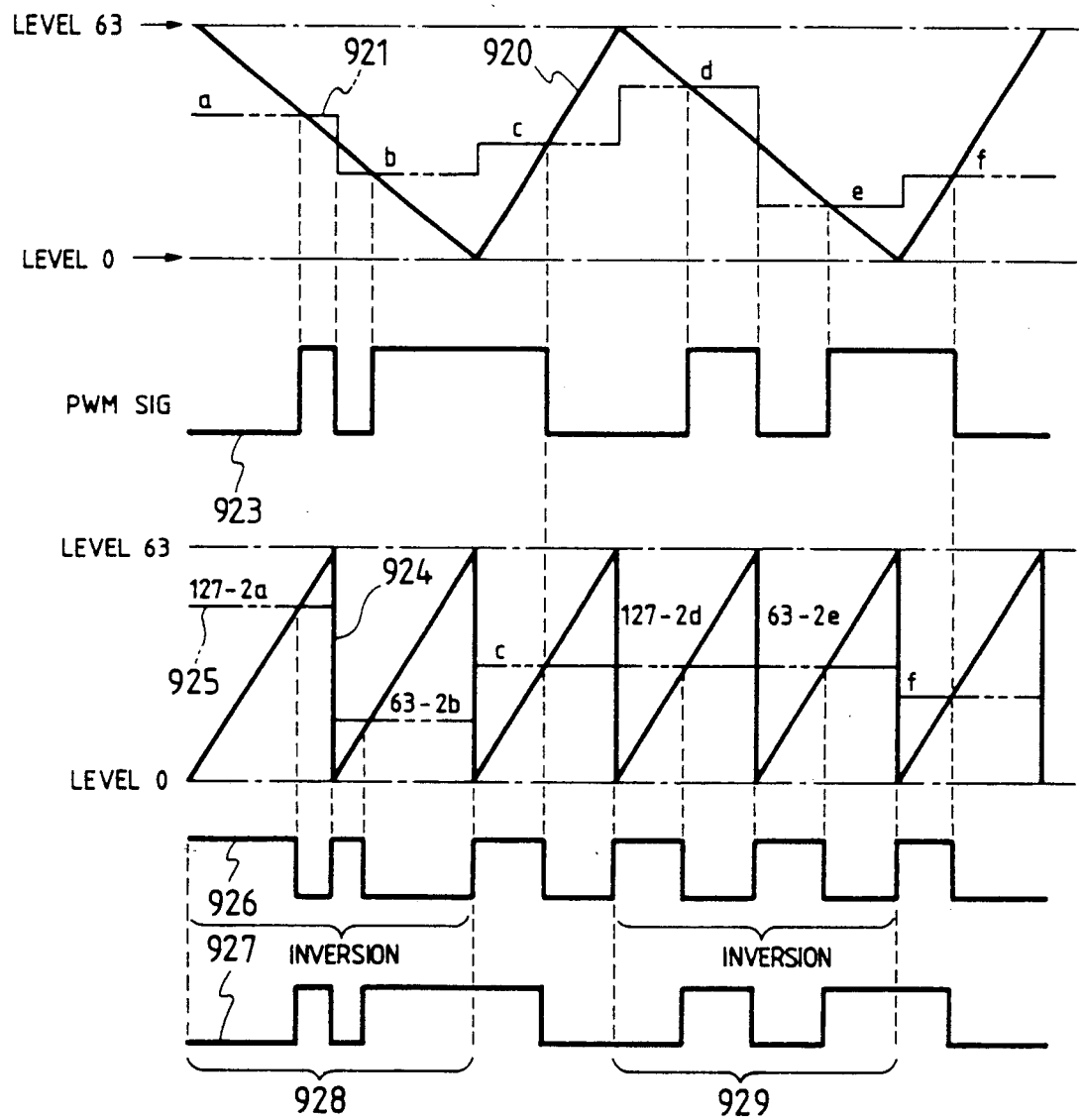
FIG. 10 is a chart showing a case wherein modulation by a 133 lines triangular wave is realized using a 400 lines saw-tooth wave in the second embodiment.

FIG. 10 shows a case wherein PWM modulation equivalent to that by a triangular wave 920 of a 133 lines screen is realized by a saw-tooth wave 924 of a 400 lines screen.

Upon conversion of portions a, b, d, and e of video data 921 corresponding to the negative inclination portions of the triangular wave 920 of the 133 lines screen, a PWM signal 927 corresponding to a PWM signal 923 by the triangular wave 920 of the 133 lines screen is obtained. That is, in the same manner as in FIG. 9, the polarity of the PWM signal 926 is inverted in sections corresponding to the negative inclination portions of the triangular wave 920, thereby obtaining the PWM signal 927 equivalent to the signal 923.

Figure 11:
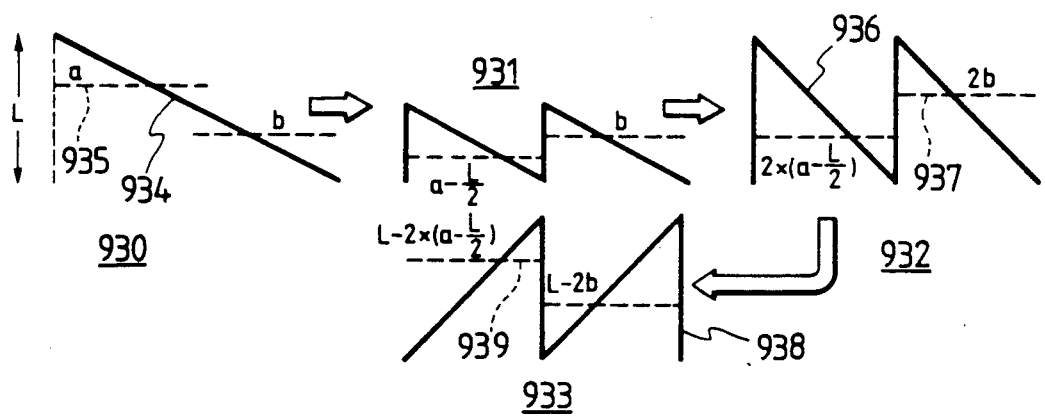
FIG. 11 is a view for explaining conversion of video data shown in FIG. 10.

FIG. 11 is a chart for explaining the operation of FIG. 10 in detail.

A waveform 930 is a negative inclination portion of a triangular wave 934 of the 133 lines screen and corresponds to 2 pixels, and its signal level width is L. A waveform 931 is set to correspond to two periods of the saw-tooth wave 924 of the 400 lines screen shown in FIG. 10 by subtracting an offset L/2 of its first half from a value "a" of video data 935. In a waveform 932, a saw-tooth wave 936 is amplified to the original range L. At the same time, the level of video data 937 is doubled. In a waveform 933, the inclination of a saw-tooth wave 938 is inverted, and video data 939 is obtained by subtracting the level of video data 937 of the waveform 932 from the total level width L, thus obtaining the PWM signal 926.

In FIG. 10, L is "63", and L/2 is "32". Therefore, video data a corresponding to the negative inclination portion of, e.g., the triangular wave 920 is converted to (127−2a), and video data b corresponding to the second half is converted to (63− 2b).

Figure 12:
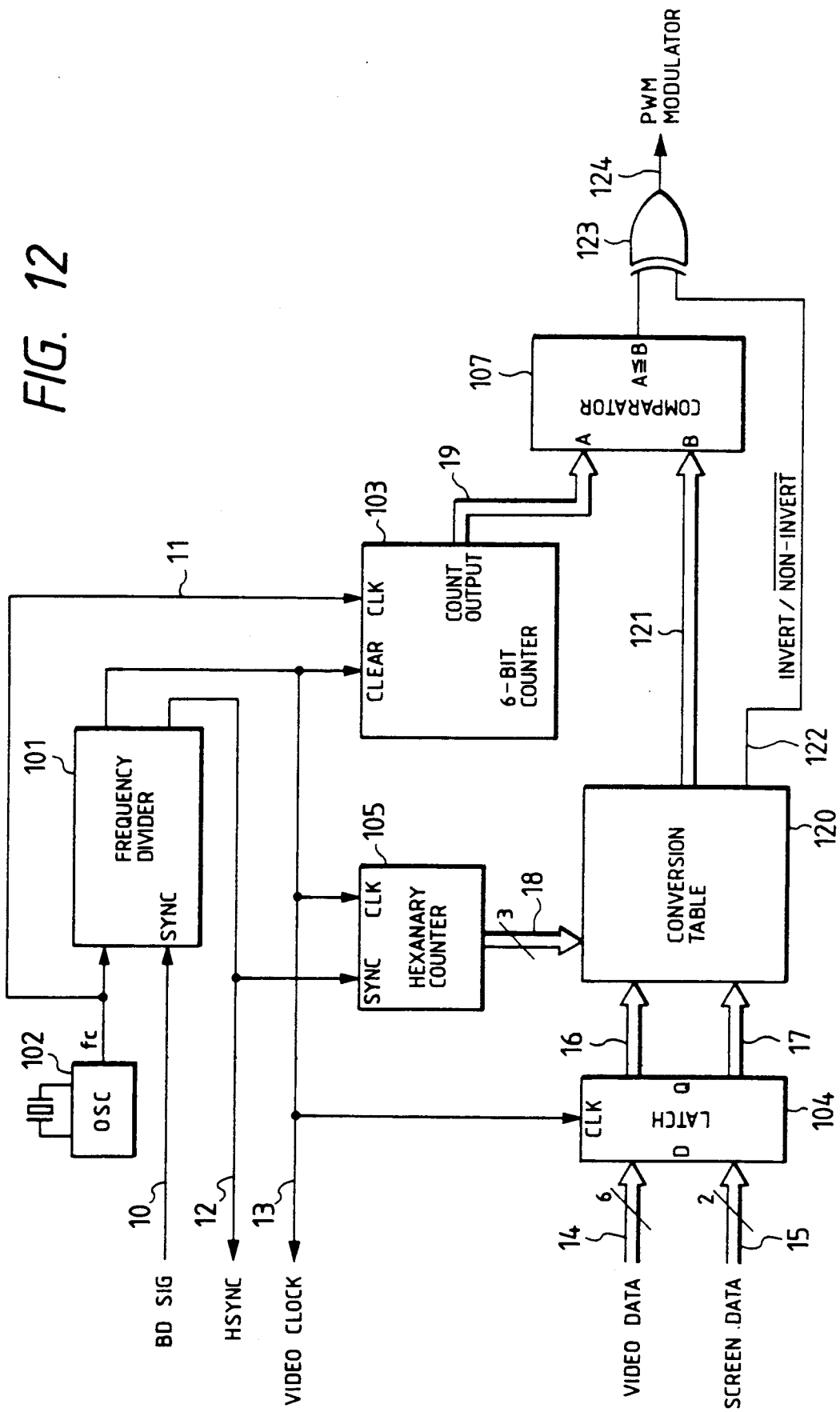
FIG. 12 is a block diagram schematically showing an arrangement of a PWM modulator of the second embodiment.

FIG. 12 is a block diagram schematically showing an arrangement of a PWM modulator of the second embodiment. The same reference numerals in FIG. 12 denote the same parts as in FIG. 1, and a detailed description thereof will be omitted.

A conversion table 120 performs data conversion, as shown in FIG. 13, and sets inverse signals 122 in inverse sections 910 to 912, 928, and 929 to be "1", as shown in FIGS. 9 and 10. When the inverse signal 122 is "1", the output from a comparator 107 is inverted by an exclusive OR gate 123, and the inverse signal is output as a PWM signal 124.

FIG. 13 shows data of the conversion table 120. Input video data 16 is indicated by "x".

When screen data 17 indicates a 200 lines screen (i.e., the screen data 17 is "1"), portions indicated by values "0, 2, 4" of conversion data 18 correspond to negative inclination portions, and portions values "1, 3, 5" of the conversion data 18 correspond to positive inclination portions. When the screen data 17 indicates a 133 lines screen (i.e., the screen data is "2"), portions indicated by values "0, 1, 3, 4" of the conversion data 18 correspond to negative inclination portions of a triangular wave, and portions indicated by values "2, 5" correspond to positive inclination portions of the triangular wave.

Figure 14:
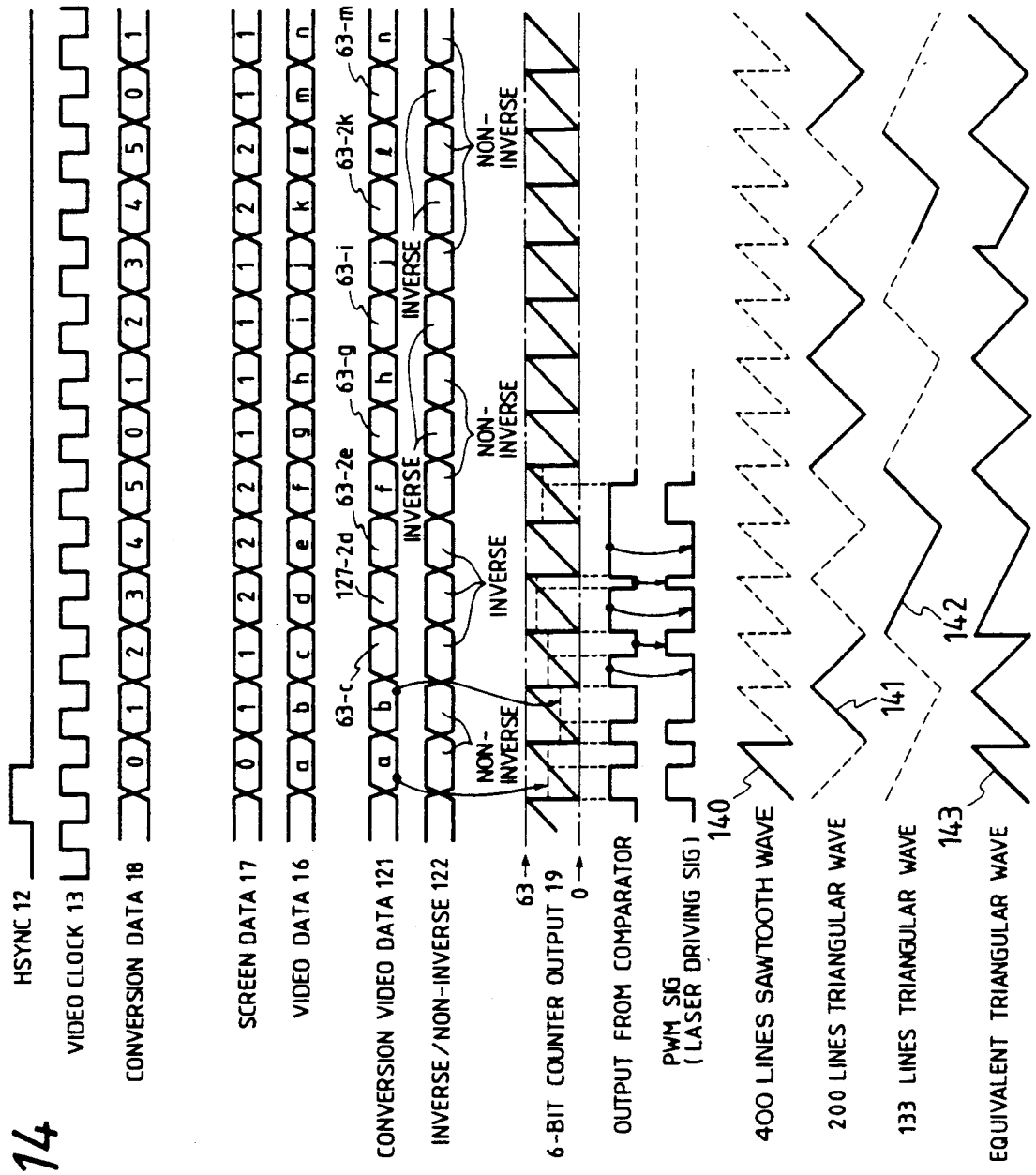
FIG. 14 is a timing chart of the block diagram of FIG. 12.

FIG. 14 shows timings of the circuit shown in FIG. 12.

The conversion data 18 is a count value obtained by counting the video clock signal 13 which changes in a pixel period of the 400 lines screen by the hexanary counter 105, and is input to the conversion table 120 together with the screen data 17 as 400 lines, 200 lines, or 133 lines recording line number data. As a result, the video data 16 input to the conversion table 120 is converted to video data 121 in accordance with the table shown in FIG. 13. The output from the comparator 107 is or is not inverted for each pixel period in response to the inverse signal 122 output simultaneously with the video data 121, and is output as a PWM signal 124.

In this manner, a PWM signal equivalent to one obtained by comparing video data 16 with an equivalent triangular wave signal 143 as a combination of solid line portions of a triangular wave 141 of the 200 lines screen, a triangular wave 142 of the 133 lines screen, and a triangular wave 140 of the 400 lines screen can be obtained by a single reference signal 19 (400 lines).

Third Embodiment (FIGS. 15–20)

Figure 15:
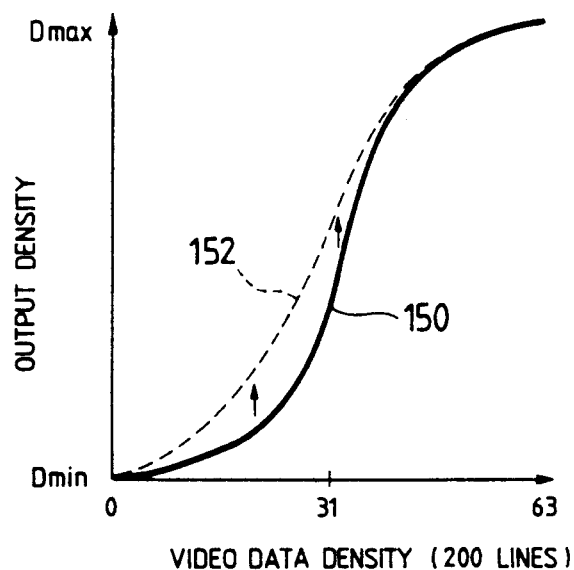
FIG. 15 is a graph showing the relationship between video data and an output density on a 200 lines screen.
Figure 16:
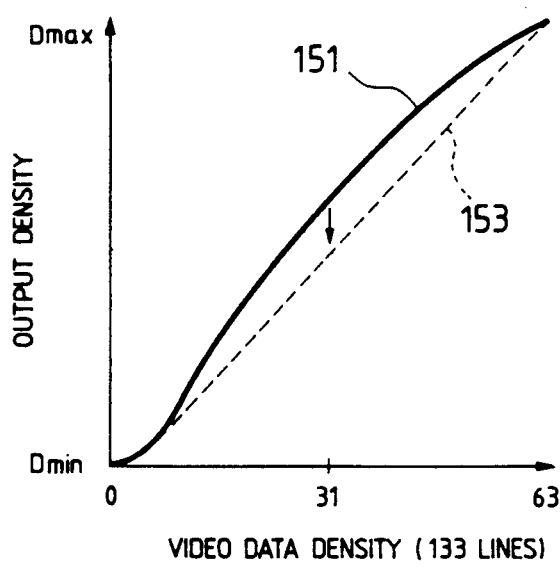
FIG. 16 is a graph showing the relationship between video data and an output density on a 133 lines screen.

When a density expression is made by an electrophotographic printer shown in FIG. 4 using the PWM signal described above, for example, an image signal modulated by the triangular wave of the 200 lines screen exhibits density expression characteristics as represented by a solid curve 150 in FIG. 15. In the case of the 133 lines screen, an image signal exhibits characteristics represented by a solid curve 151 in FIG. 16. More specifically, since the 200 lines screen has a small screen interval, the potential on the photosensitive drum 301 cannot easily provide an edge effect, and toner cannot be developed unless video data of a certain level is given. Since the 133 lines screen has a large screen interval, the potential on the photosensitive drum 301 easily provides the edge effect, and toner can be developed by video data of a relatively small level.

In either case, it is preferable that an output density is linearly changed with respect to the video data. For this reason, for the 200 lines screen, a triangular wave is converted to a saw-tooth wave 170 shown in FIG. 17, so that video data of a relatively small level can provide output density characteristics as represented by a dotted curve 152 in FIG. 15. For the 133 lines screen, a triangular wave is converted to a saw-tooth wave 180 shown in FIG. 18, so that an inclination of the density curve is decreased to provide output density characteristics represented by a dotted curve 153 in FIG. 16.

Figure 17:
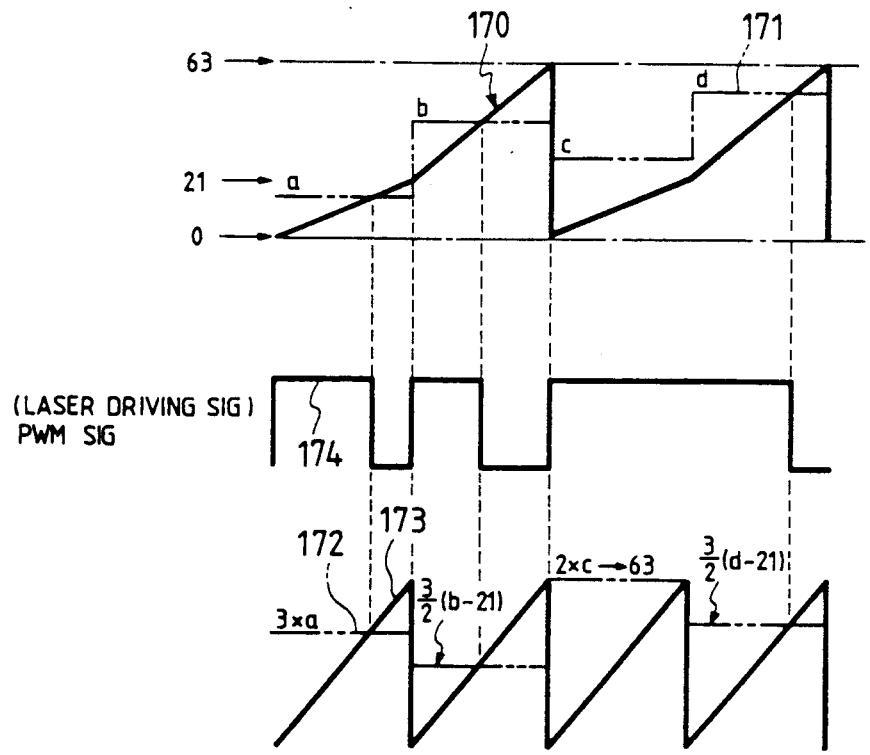
FIG. 17 is a chart showing a case wherein modulation by a 200 lines deformed saw-tooth wave is realized by a 400 lines saw-tooth wave in a third embodiment.

In FIG. 17, the rising width of the first half of the 200 lines deformed saw-tooth wave 170 corresponds to ⅓ the total signal width, and that of the second half corresponds to the remaining ⅔ width. That is, in the same manner as in the video data 502 shown in FIG. 5, a portion of video data 171 corresponding to the first half of the triangular wave (the signal level "a") multiplied by (3×a), and an offset "21" of the triangular wave is subtracted from a portion corresponding to the second half (the signal level is "b") and the difference is multiplied by the reciprocal of the signal width (3/2) of the saw-tooth wave 170, thus obtaining video data 172. The video data 172 is compared with a saw-tooth wave 173 of the 400 lines screen, thereby outputting a PWM signal 174 equivalent to the saw-tooth wave 170 of the 200 lines screen.

Figure 18:
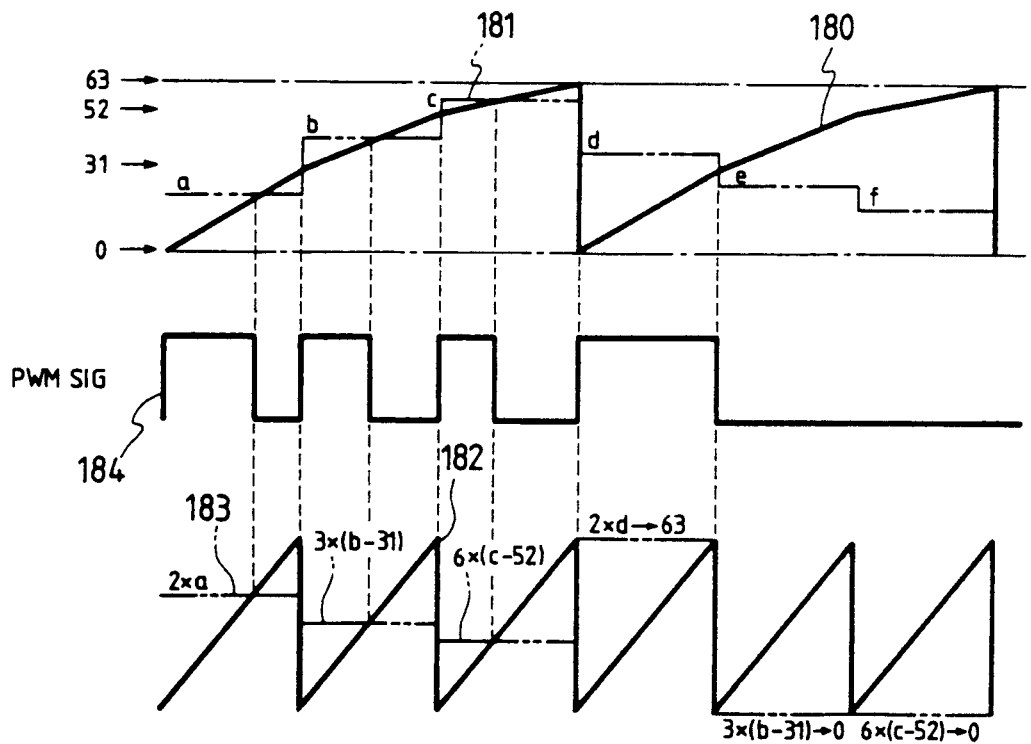
FIG. 18 is a chart showing a case wherein modulation by a 133 lines deformed saw-tooth wave is realized by a 400 lines saw-tooth wave in the third embodiment.

In FIG. 18, the rising width of the first portion of the saw-tooth wave 180 of the 133 lines screen corresponds to ½ the total signal width, the signal level of the second portion rises from "31" to "52", and the signal level of the third portion rises from "52" to "63". More specifically, the rising width of the third portion corresponds to ½ the total signal width, that of the second portion corresponds to ⅓, and that of the third portion corresponds to 1/6, respectively.

In order to achieve equivalent PWM modulation using a saw-tooth wave 182 of the 400 lines screen, video data 181 corresponding to the first portion is doubled (2×a). An offset "31" of the saw-tooth wave 180 is subtracted from video data 181 (the signal level is "b") corresponding to the second, portion (b−31) and the difference is multiplied by the reciprocal (3) of the signal width of the saw-tooth wave 180 corresponding to the second portion. An offset "52" of the saw-tooth wave 180 is subtracted from the video data 181 corresponding to the third portion (signal level is "c"), and the difference is multiplied by the reciprocal "6" of the signal width of the third portion of the saw-tooth wave 180, thus obtaining video data 183. The video data 183 is compared with the saw-tooth wave 182 of the 400 lines screen, thus obtaining a signal equivalent to a PWM signal 184 by the deformed saw-tooth wave 180 and the video data 181.

Figure 19:
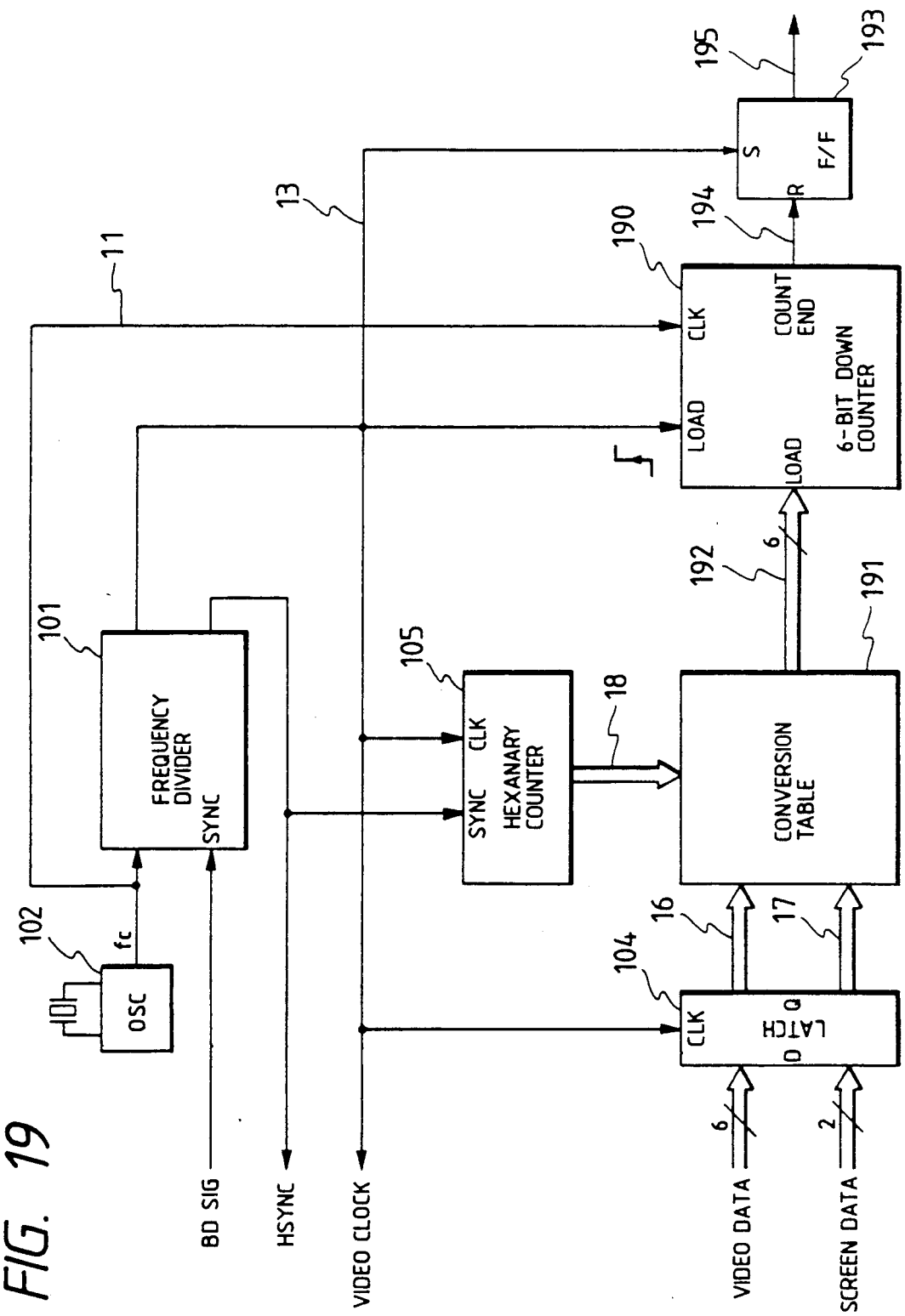
FIG. 19 is a block diagram schematically showing an arrangement of a PWM modulator of the third embodiment.

A circuit realizing this may be the same as that shown in FIG. 1. However, in this embodiment, as shown in FIG. 19, a 6-bit down counter 190 and a flip-flop 193 are used in place of the 6-bit counter 103 and the comparator 107 shown in FIG. 1. The 6-bit down counter 190 loads video data 192 in response to the leading edge of the video clock signal 13 every 64 clocks of the clock signal 11, and starts count-down in synchronism with the clock signal 11. Upon completion of the count-down of the loaded value to be counted, the counter 190 outputs a count end signal 194.

The flip-flop 193 is set in response to the leading edge of the video clock signal 13, and is reset in response to the count end signal 194. The output from the flip-flop 193 becomes a PWM signal 195 shown in FIG. 21.

Figures 20, 21:
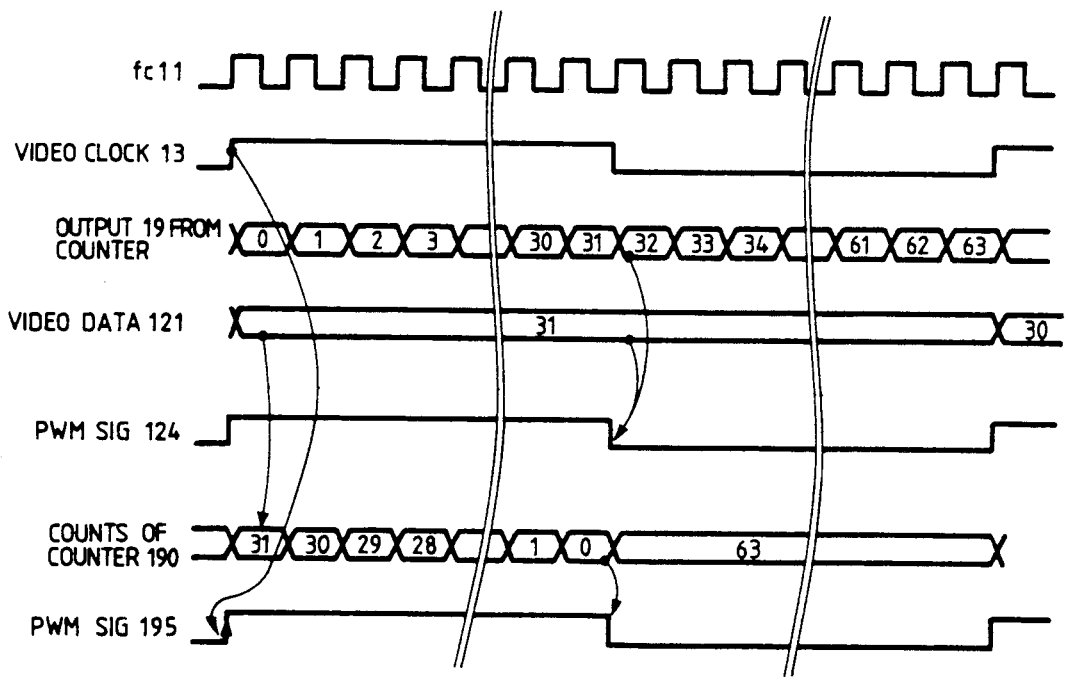
FIG. 20 is a table showing data conversion by a conversion table 191 shown in FIG. 19.
FIG. 21 is a timing chart for comparing the timings of the block diagram of FIG. 19 and timings of the block diagram of FIG. 12.

FIG. 20 shows video data converted by a conversion table 191, and video data 16 is represented by "x". As can be seen from FIG. 20, the conversion table 191 stores conversion data for converting the input video data 16 into the video data 172 and 183 shown in FIGS. 17 and 18.

Figure 22:
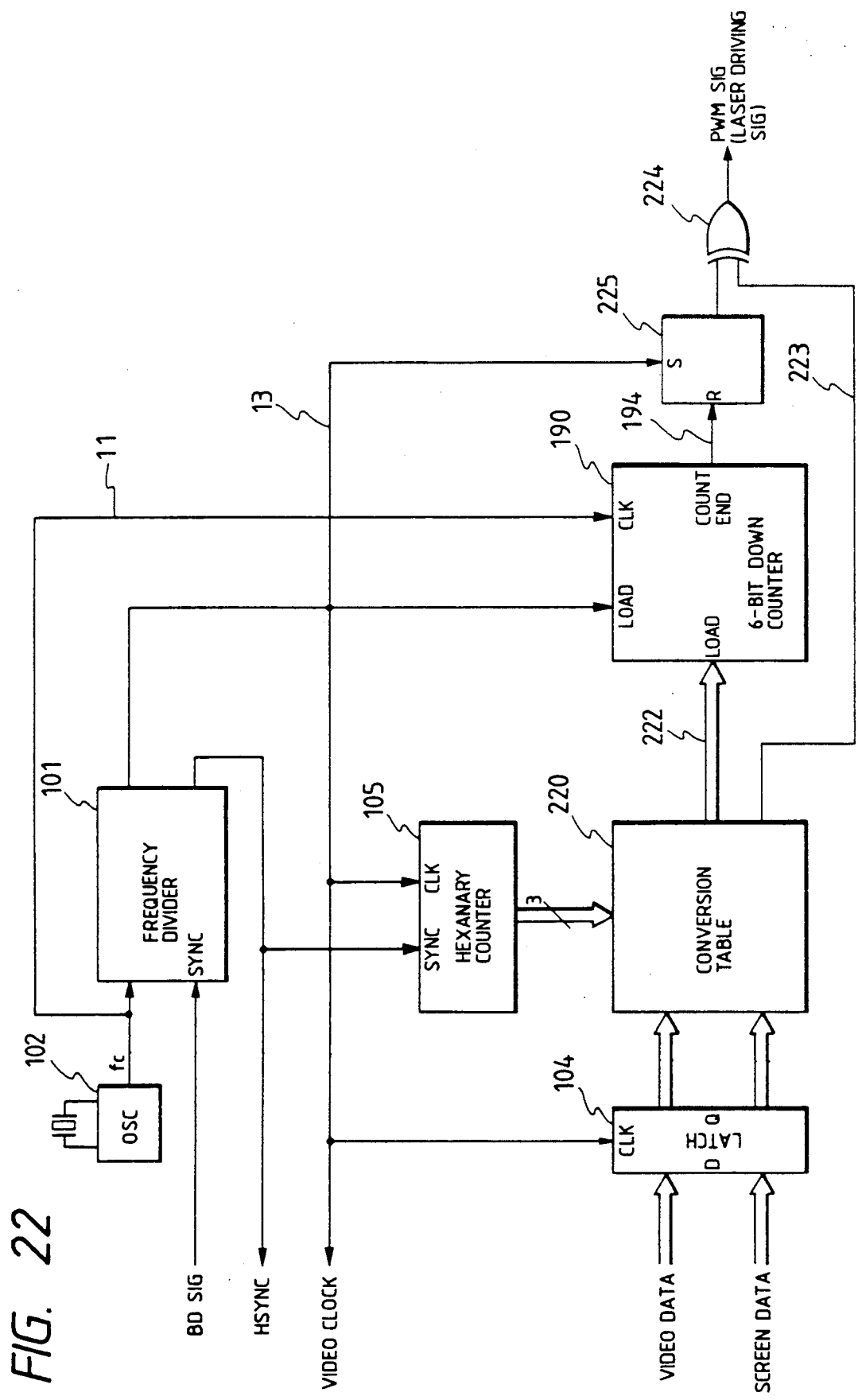
FIG. 22 is a block diagram schematically showing an arrangement of a PWM modulator according to still another embodiment.
Figure 23:
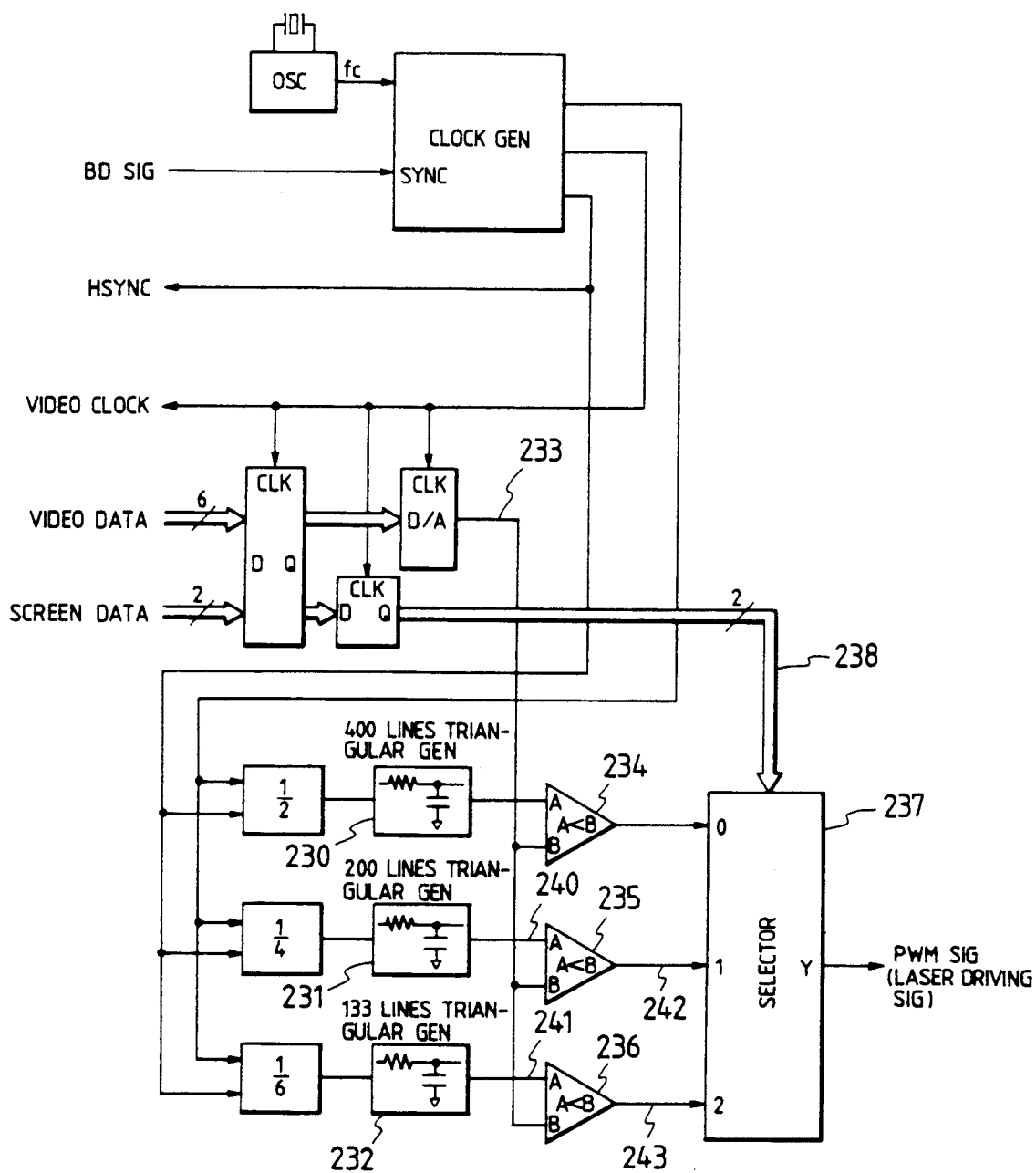
FIG. 23 is a block diagram showing an arrangement of a conventional PWM modulator.
Figure 24A:
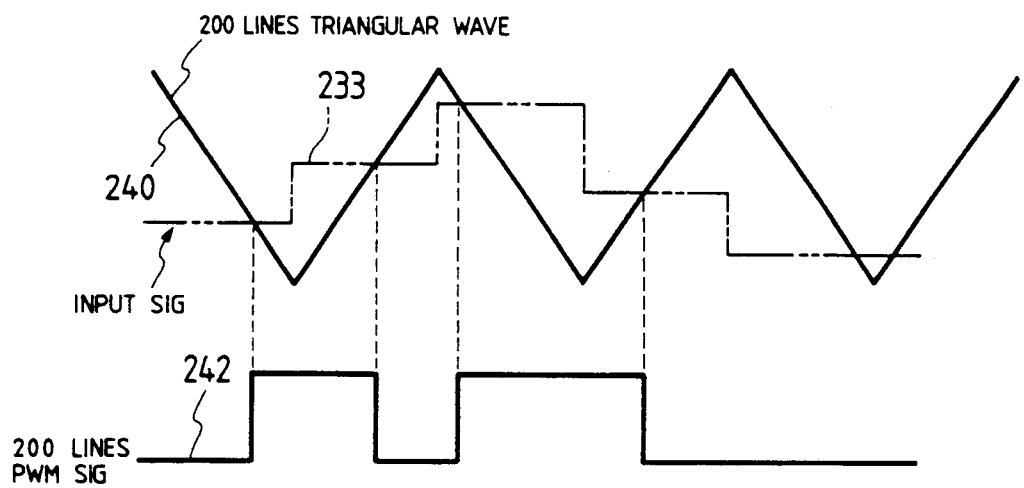
FIGS. 24A and 24B are charts showing modulation timings of FIG. 23.
Figure 24B:
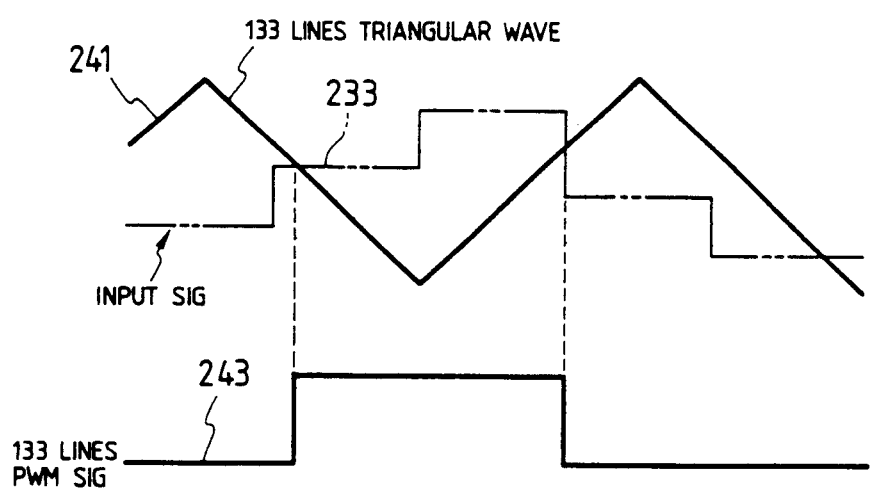

Other Embodiments (FIGS. 21 and 22)

In the above embodiments, the number of lines is switched among three modes, i.e., 400 lines screen, 200 lines screen, and 133 lines screen modes. The smaller number of lines, e.g., 100 lines screen, 50 lines screen, or the like can be easily realized by changing the content of the conversion table.

In this case, a cycle of count values of the conversion data 18 can be determined as follows. That is, a multiple of a reference number of lines (in this case, 400 lines) for obtaining the section length of a number of lines to be selected is calculated, and its least common multiple is determined as the cycle.

In the conversion table, when the converted video data 192 exceeds the maximum signal value 63, the data is set to be "63", and if it becomes smaller than the minimum signal value "0", it is set to be "0".

In the third embodiment, saw-tooth waves having different inclinations are combined. This can be applied to a triangular wave in the second embodiment.

As shown in FIG. 22, in the PWM modulator for generating the triangular wave 19 shown in FIG. 12, a 6-bit down counter 190 and a flip-flop 225 are used in place of the counter 103 and the comparator 107, and the output from the flip-flop 225 is inverse-controlled in accordance with an inverse/non-inverse signal by an EXOR gate 224, thereby obtaining the same PWM output as in FIG. 12. This can be understood from the operation of the counter 190 shown in FIG. 21.

As described above, according to this embodiment, one saw-tooth wave generator or an equivalent down counter is arranged, and an image signal value which changes at a relatively low speed is converted at a predetermined period, thus forming a pulse signal having an arbitrary period. Thus, the cost of the circuit can be reduced. Since a saw-tooth wave and a triangular wave can be generated by an identical operation and the inclinations of the waveforms can be locally changed, economy of the circuit can be improved.

The present invention can also be applied to various other output apparatuses, such as an LED printer, an ink-jet printer, a thermal printer, and the like as well as to the laser beam printer.

The present invention is not limited to the above-mentioned specific embodiments, and various other changes and modifications may be made within the spirit and scope of the appended claims.

What is claimed is:

1. An image processing apparatus comprising:
  input means for inputting an image signal;
  conversion means for converting the image signal input from said input means and outputting the converted image signal; and
  output means for outputting a pulse-width modulation signal based on the converted image signal output from said conversion means, wherein said output means is operated in a fixed-period processing mode regardless of an output characteristic of the pulse-width modulation signal, and outputs the pulse-width modulation signal, and wherein said conversion means switches a conversion mode of the input image signal in association with the output characteristic of the pulse-width modulation signal.

2. An apparatus according to claim 1, wherein said input means inputs a digital image signal, and said conversion means converts the input digital image signal and outputs the converted digital image signal.

3. An apparatus according to claim 2, wherein said output means comprises count means for counting a predetermined clock signal and generating a digital pattern signal, and a digital comparator comparing the digital pattern signal generated by said count means with the converted digital image signal and outputting the pulse-width modulation signal.

4. An apparatus according to claim 2, wherein said output means comprises a counter for counting a predetermined signal, by a value corresponding to the image signal converted by said conversion means, and outputs a pulse-width modulation signal corresponding to an output from said counter.

5. An apparatus according to claim 2, wherein said conversion means has a plurality of different conversion tables for converting the input digital image signal, and wherein said conversion means selectively uses one or more of the plurality of conversion tables in association with an output characteristic of the pulse-width modulation signal.

6. An image processing apparatus comprising:
input means for inputting a digital image signal;
conversion means for converting the digital image signal input from said input means and outputting a converted digital image signal; and
output means for outputting a pulse-width modulation signal based on the converted digital image signal output from said conversion means,
wherein said conversion means has a plurality of different conversion tables for converting the input digital image signal, and wherein said conversion means selectively uses one or more of the plurality of conversion tables in association with an output characteristic of the pulse-width modulation signal.

7. An apparatus according to claim 6, wherein said output means comprises count means for counting a predetermined clock signal and generating a digital pattern signal, and a digital comparator comparing the digital pattern signal generated by said count means with the converted digital image signal and outputting the pulse-width modulation signal.

8. An apparatus according to claim 6, wherein said output means comprises a counter for counting a predetermined clock signal by a value corresponding to the image signal converted by said conversion means, and outputs a pulse-width modulation signal corresponding to an output from said counter.

9. An image processing apparatus comprising:
input means for inputting an image signal;
conversion means for converting the image signal input from said input means and outputting a converted image signal; and
output means for processing the converted image signal output from said conversion means,
wherein said output means operates in a fixed period processing mode, and said conversion means changes a conversion characteristic of the image signal input from said input means to switch a resolution of an output signal from said output means.

10. An apparatus according to claim 9, wherein said input means inputs a digital image signal, and said conversion means converts the input digital image signal and outputs the converted digital image signal.

11. An apparatus according to claim 10, wherein said output means comprises count means for counting a predetermined clock signal and generating a digital pattern signal, and a digital comparator comparing the digital pattern signal generated by said count means with the converted digital image signal and outputting the pulse-width modulation signal.

12. An apparatus according to claim 10, wherein said output means comprises a counter for counting a predetermined clock signal by a value corresponding to the image signal converted by said conversion means, and outputs a pulse-width modulation signal corresponding to an output from said counter.

* * * * *